July 18, 1950 H. C. PUETT 2,516,073
STARTING STRUCTURE
Filed Oct. 9, 1945
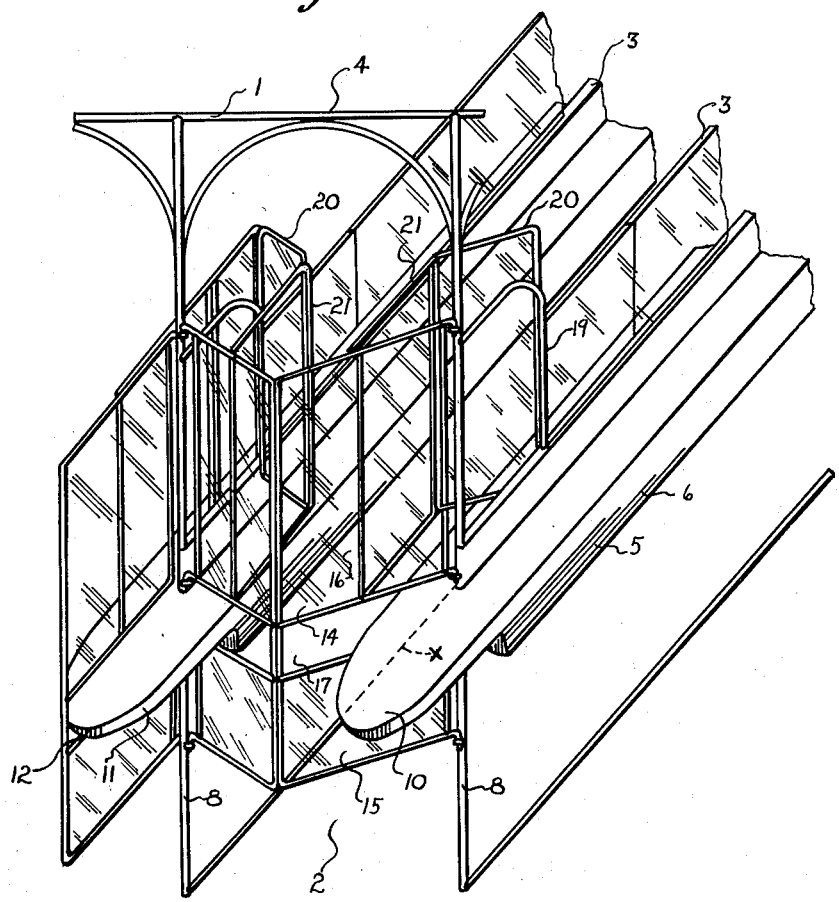
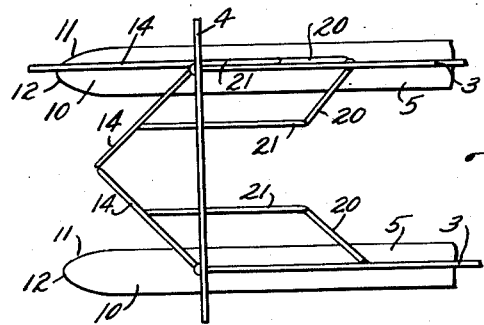
INVENTOR
HOYT CLAY PUETT
*Ernest E Parver*
ATTORNEY Patented July 18, 1950

2,516,073

UNITED STATES PATENT OFFICE 2,516,073

STARTING STRUCTURE

Hoyt Clay Puett, Kamloops, British Columbia, Canada

Application October 9, 1945, Serial No. 621,253

3 Claims. (Cl. 119—15.5)

My invention relates to improvements in starting structures which are adapted for use in horse racing.

The objects of the invention are to provide means in the stall of a starting structure for keeping each horse's neck and head aligned with his body so that all of the horses may be in an equally good position to start away from their individual stall; to provide means whereby each horse can see the horse standing beside him and wherein his forward view may be substantially unrestricted, so that the horse may be free from that nervousness which so frequently results through being confined in the closed stall of a starting structure. A further object of the invention is to provide means whereby the gates of a stall may open into substantial alignment with the walls of said stall, and to provide a fixed forward extension to the side cushion pads of the stall so that the horse will be unable to contact any part of the gate with his legs or body as he passes through said gates.

Figure 1 is a general view of the invention showing the front portion of one stall of a starting gate structure. Figure 2 is a plan view showing the front portion of one stall.

The numeral 1 indicates generally a starting gate structure having stalls 2, one only shown, each stall having side wall frames 3 suspended from a top frame 4. Intermediate the height of each side wall frame a padded cushion 5 extends horizontally. These cushions are of substantial depth and have side faces 6 which may be contacted by the legs of a horse standing between them prior to the start of a race. The cushion faces 6 of a stall are so closely spaced apart as to keep a horse in alignment with his stall.

The cushions 5 extend forwardly of the starting gate posts 8, as at 10, said cushion extension being of lesser depth than the cushions 5, but of the same general width adjacent the gate post and tapering off as at 11 to a rounded end 12.

Each stall 2 is fitted with front gates 14, each of which is divided into lower and upper panels 15 and 16 respectively and a horizontal space 17 to permit said gates to swing beyond the face of the cushion extension and to come to rest substantially along the centre of the cushion extension 10 and in substantial alignment with the side wall frame 3 and come to rest along the dotted lines X on the drawing, when in fully open position.

A post 19 of each side wall frame 3 hingedly supports a panel 20, which is held at all times parallel to its correspondng gate 14 by a panel 21 which is hingedly connected to said panel 20 and to the horizontal centre of the gate. The panel 21 obviously remains at all times parallel to the side wall frame 3 and as the gates are closed, as shown in the drawing, to a point where the gates of each pair are substantially at an angle of 90 degrees to each other, the opposing panels 20 will be at the same angle and the space between the panels 21 will be close enough to keep the head of the horse in the stall substantially in line with his body. The jockey's knees will be somewhat behind the panels 20 in the unrestricted stall space.

The upper panels 16 of the gates 14, the panels 20 and 21 are preferably fitted with transparent material such as plastic or glass, so that while the horse in each of the stalls is prevented from sidewise movement and his neck is held against excessive movement, his vision is by no means impaired and consequently he is not seriously excited while awaiting the opening of the gates.

When the gates are allowed to spring open, the gates 14 and the panels 20 and 21 recede substantially into the plane of the side wall frames 3, thus leaving the horse and rider a clear unrestricted space, so that he can get away with ease and both horse and jockey are fully protected by the cushion extensions 10 against touching any part of the gate or other enclosing members.

What I claim as my invention is:

1. In a starter gate structure having a stall defined between spaced partitions and a pair of gates hinged to the front end of the partitions to form a V-shaped closure for the end of the stall, a wing panel adapted to restrain sidewise movement of a horse's head when in the stall, said panel being hingedly connected intermediate the width of each gate and a hinged linkage connecting the free end of the wing panel to the adjacent partition to cause said wing panel to move in parallelism with and towards said partition as the gate is opened.

2. In a starter gate structure having a stall defined between spaced partitions and a pair of gates hinged to the front end of the partitions to form a V-shaped closure for the end of the stall, a wing panel adapted to restrain sidewise movement of a horse's head when in the stall, said panel being hingedly connected intermediate the width of each gate and a second panel hingedly connected to the first panel and hingedly connected to the adjacent partition, said first panel being adapted to move in parallelism with the partition and said second panel being adapted to move in parallelism with the gate.

3. In a starter gate structure as claimed in claim 1, said wing panels being of substantially transparent material.

HOYT CLAY PUETT.

REFERENCES CITED

The following references are of record in the file of this patent:

UNITED STATES PATENTS

| Number | Name | Date |
| --- | --- | --- |
| 1,870,768 | Comfort et al. | Aug. 9, 1932 |
| 2,211,457 | Cowell | Aug. 13, 1940 |
| 2,319,420 | Macksoud | May 18, 1943 |
| 2,354,821 | Mackenzie | Aug. 1, 1944 |